Figure 13:
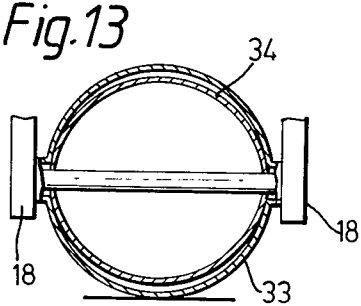

United States Patent [19]

Pedro-Palomer

[11] 4,236,765

[45] Dec. 2, 1980

[54] ROTATABLE AND SUPPORTING MECHANISMS

[76] Inventor: Enrique Pedro-Palomer, 10 to 12, Calle Idumea, Barcelona, Spain

[21] Appl. No.: 870,435

[22] Filed: Jan. 18, 1978

[30] Foreign Application Priority Data

Jan. 18, 1977 [ES] Spain .................................. 455.146
Aug. 25, 1977 [ES] Spain .................................. 461.891

[51] Int. Cl.³ .......................... F16C 7/04; F16C 35/00
[52] U.S. Cl. ...................................................... 308/9
[58] Field of Search .............. 308/9, 3 R, 3 A, 5 R, 308/4 R, 25, DIG. 13, DIG. 1, 122, 3 B, 203

[56] References Cited

U.S. PATENT DOCUMENTS

| | | | |
|---|---|---|---|
| 3,380,350 | 4/1968 | Stewart | 308/5 R X |
| 4,113,324 | 9/1978 | Rohr | 308/9 |
| 4,119,375 | 10/1978 | Kirk et al. | 308/9 |

*Primary Examiner*—Douglas C. Butler
*Attorney, Agent, or Firm*—Young & Thompson

[57] ABSTRACT

A rotary supporting mechanism comprises a pair of cylindrical or spherical hollow bodies arranged one inside the other, there being a quantity of liquid between the two bodies, one of the bodies remaining fixed while the other is movable rotationally and in an up-and-down direction with respect to the body which remains fixed, the liquid between the bodies absorbing loads applied to the movable body. The movable body may be rotatable about a horizontal or vertical axis or, in the case of a sphere, may be rotatable in all directions. Bearing elements may be provided between the two bodies as well as seals to prevent the escape of the liquid.

1 Claim, 23 Drawing Figures

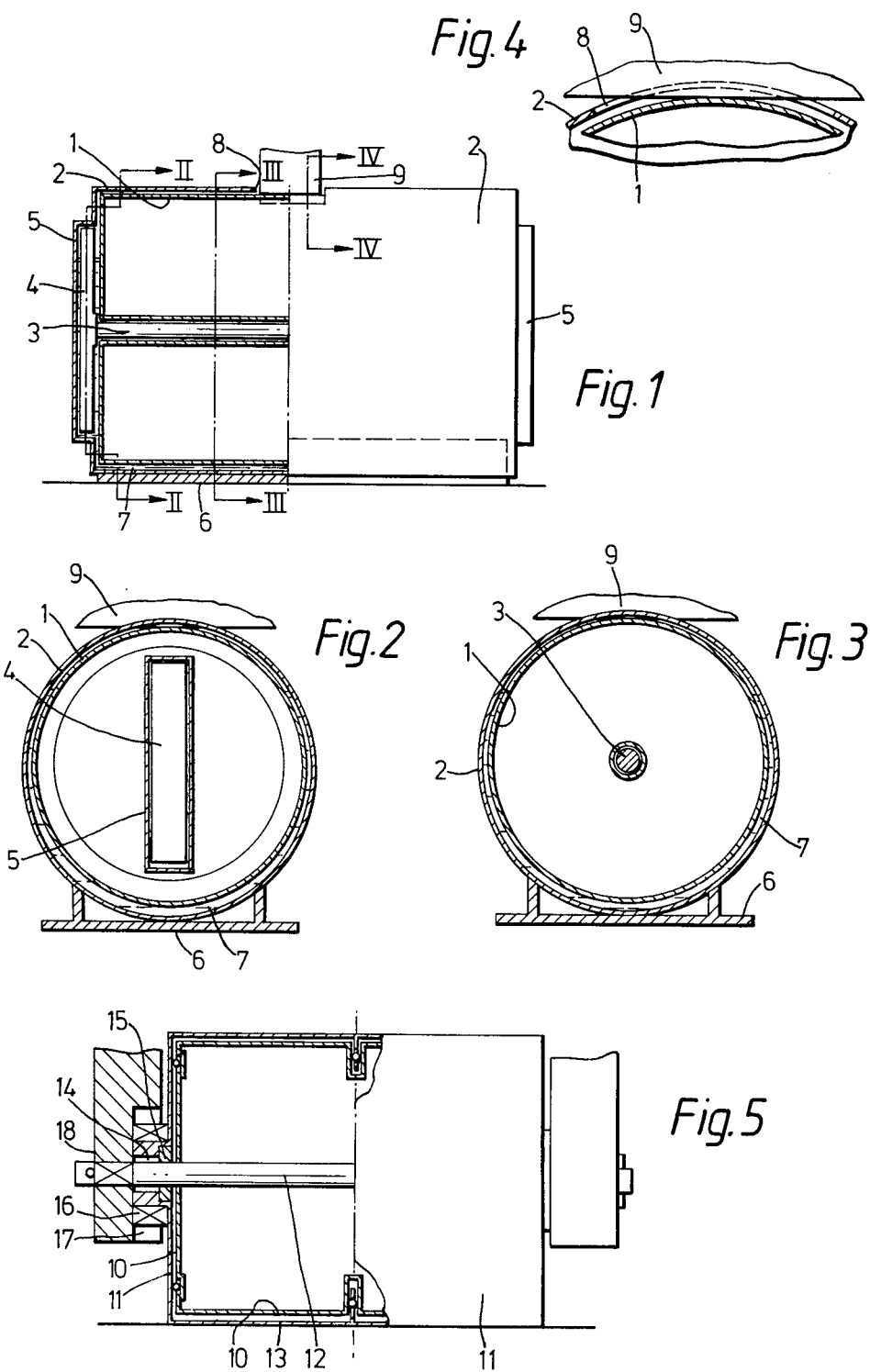

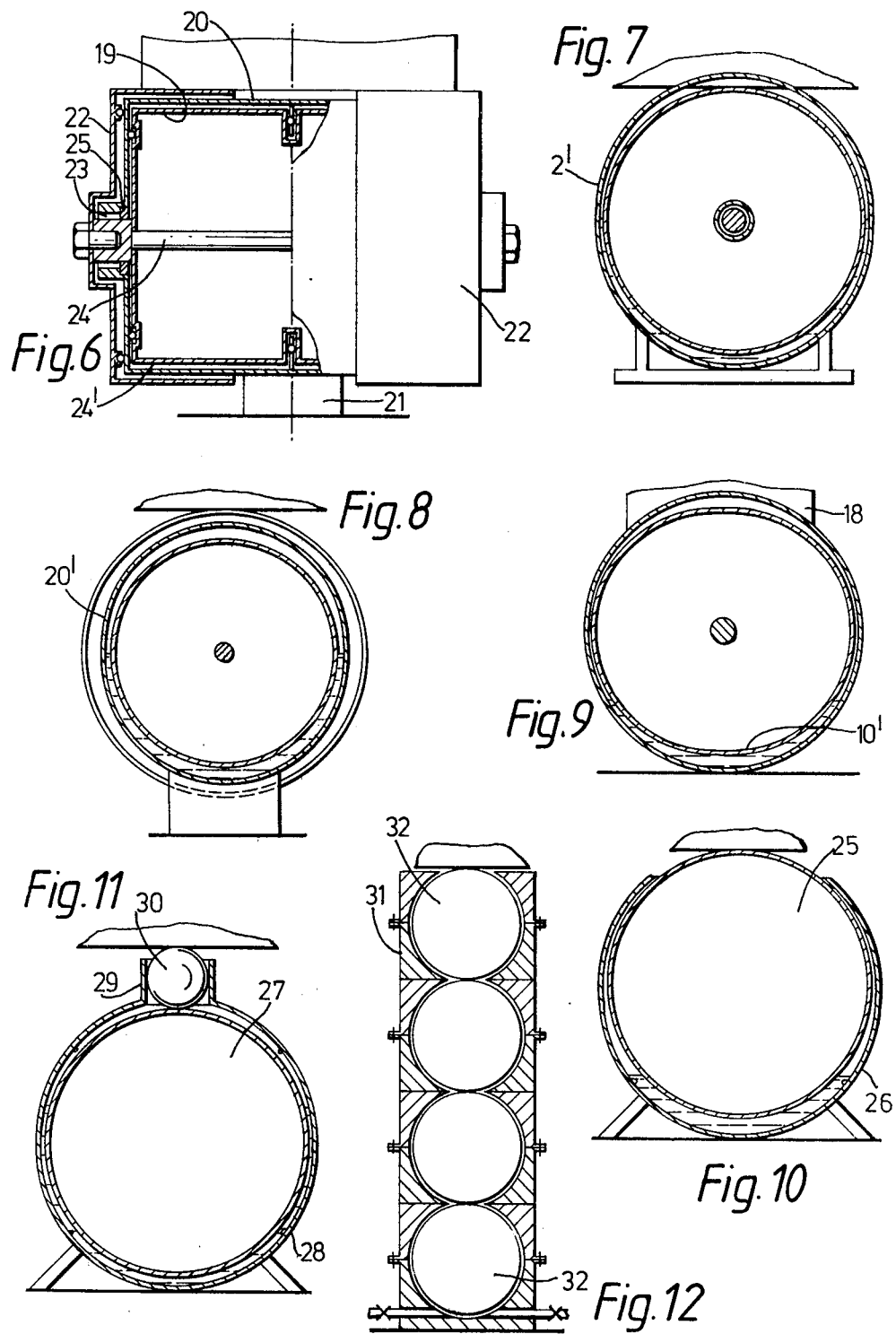

ROTATABLE AND SUPPORTING MECHANISMS

The invention relates to rotary supporting mechanisms for many different applications, whose particular essential is that of comprising a pair of hollow bodies arranged one inside the other, featuring between them a quantity of liquid, one of the said bodies being maintained fixed while the other is movable rotationally and can move up-and-down simultaneously with respect to said fixed body; the liquid between the two bodies absorbing loads which rest on or slide over the movable body.

The loads which rest or slide over such mechanisms may be moved by means of motors with a very reduced power and consequently with a minimum expense of energy. Such mechanisms may be used to support rotary platforms and bodies which are linearly displaced, being also capable of adaptation to bodies with their own means of movement or which are towed along by others possessing it, specifically, to any mechanical complex or installation submitted to a rotary or linear motion, which, moreover, is improved in the following aspects: absorption of vibration, practically no lubrication, and inappreciable wear in those gears and bearings necessary for effecting movement, because the work to which the said elements are subjected is insignificant in view of the reduced resistance to to movement.

Such rotary supporting mechanisms may assume a cylindrical, spherical, hemispherical, or conical shape, or whatever other shape is considered pertinent. In some instances it may be the outer body which effects the rotary movement, whilst in others, which will be more frequent, the said movement will be effected by the internal body, the axis of rotation being disposed, as convenient, in a horizontal, vertical, or inclined position. It will be seen that such diversity of shapes and applications does not alter or detract from the essential unity with which the invention is endowed, because the rotary supporting mechanisms according to the invention are all made up of two complementary bodies, one of them fixed and the other movable up-and-down and rotationally, with a liquid mass between them.

These characteristics remain fixed through the range of examples which will be cited, not being affected, moreover, by any additional element of the conventional kind being incorporated, such as seals and flexible joints, bearings, inlet and outlet liquid control valves, electric motors, gears, amongst other known items and in current usage in mechanisms in other technical fields.

Figure 14:
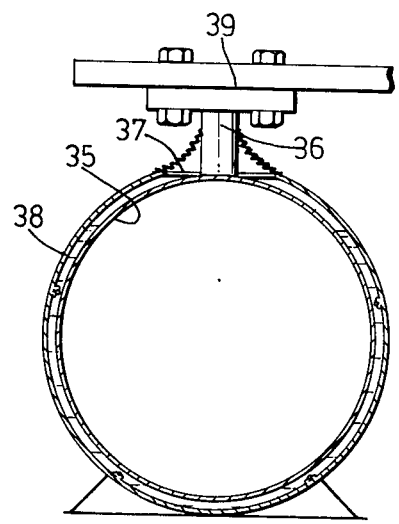
Figure 15:
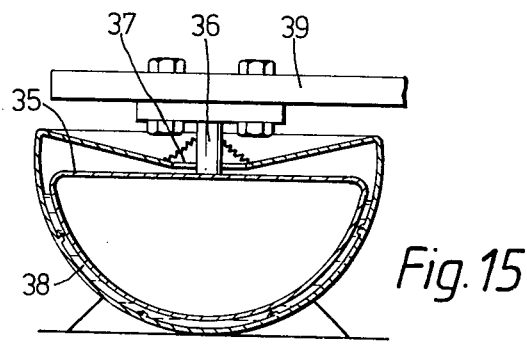
Figure 18:
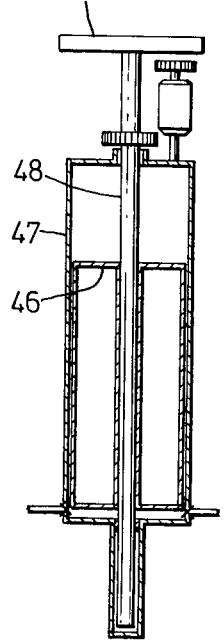
Figure 19:
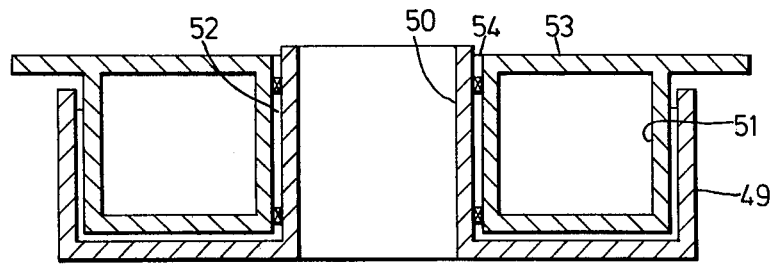
Figure 20:
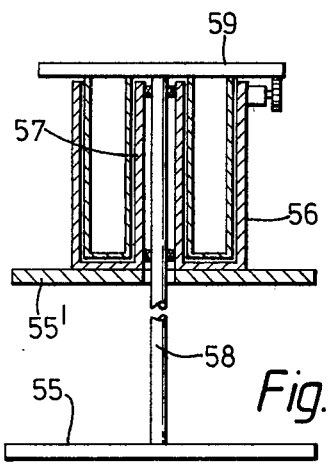
Figure 22:
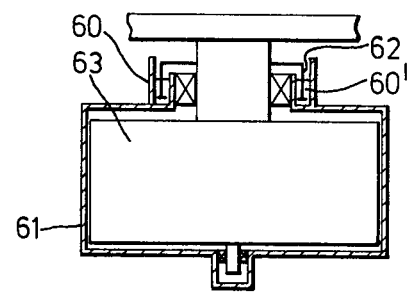
Figure 21:
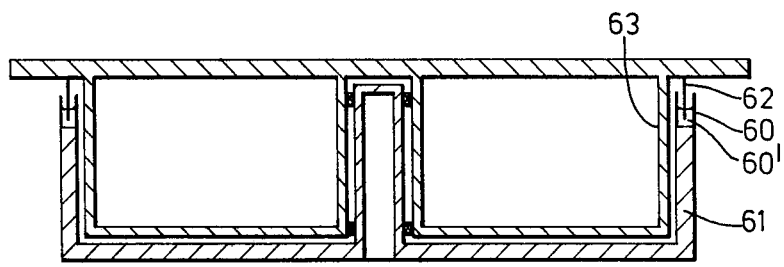
Figure 23:
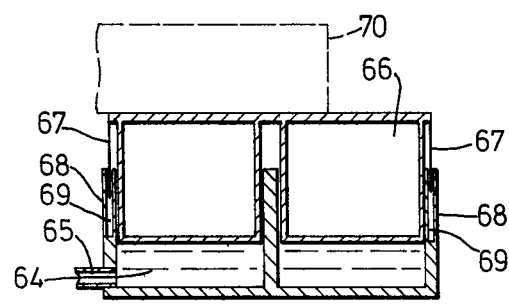

For a better understanding of the following description reference should be made to the accompanying drawigs in which are shown practical embodiments of some mechanisms in accordance with the invention, shown schematically and merely as examples. In the said drawings:

FIG. 1 is a partial sectional view in which is shown a rotary supporting mechanism comprising two cylinders of which the inside one is rotatable and the outer one fixed, FIGS. 2, 3 and 4 are cross-sectional views taken along the lines II—II, III—III, and IV—IV respectively of FIG. 1, FIG. 5 is a longitudinal view, also in partial section, in which is shown a rotary supporting mechanism made up of two cylinders, the outer being rotatable and the inner one fixed, FIG. 6 is a longitudinal view of a rotary supporting mechanism, also partly sectioned, comprising a pair of cylinders, the inner one being rotatable whilst the outer one is fixed, featuring moreover, at the ends of the axis of the interior cylinder, bodies which rotate in unison therewith, FIGS. 7, 8, and 9 are cross-sections basically related to the figures just described, in which the fixed cylindrical body assumes a flattened cylindrical shape, FIGS. 10, 11, 12, and 13 show a series of rotary supporting mechanisms similar to all those previously described, but comprising rotating bodies of a spherical shape, whilst the fixed bodies assume a flattened spherical shape, FIGS. 14 and 15 show some rotary supporting mechanisms which behave by describing a ball and socket movement, FIGS. 16, 17, 18, 19, and 20 show some rotary supporting mechanisms where the axis of rotation is arranged vertically, FIGS. 21 and 22 are variants of the arrangements of FIGS. 19 and 20 but differ from the same by having incorporated a mercury syphon joint by which heavy loads are absorbed which at a given moment could otherwise cause the liquid to spill from the rotary supporting mechanism by simply rising up, and FIG. 23 represents a syphon valve which can also be applied to some of the rotary supporting mechanisms with the same purposes as those previously specified.

A first embodiment of the invention shown in FIG. 1 comprises two hollow cylindrical bodies 1 and 2 arranged concentrically. The inner cylinder 1 has, extending axially within it, a tubular structure which can rotate freely about a shaft 3 to the ends of which are secured plates 4 extending perpendicularly to the shaft. The plates are located, and slidable up and down, in vertical guides 5 formed in the ends of the cylinder 2, which is fixed and is seated on a pedestal 6, which suitably retains it. In the space between the cylinders 1 and 2, which is limited as much as possible in all directions, there is provided a body of liquid 7 in which the rotatable inner cylinder 1 floats, whilst, in an upper part, the fixed outer cylinder 2 features an opening 8 through which extends a projection 9 of a platform, machine, chassis, or vehicle intended to be slid over the mechanism in question. In the case of a rotatable platform, a number of rotary supporting mechanisms are arranged equidistantly spaced in a circle below the platform, the weight of which, together with any load deposited on its surface, is thus absorbed by the rotatable cylinders 1 of the mechanisms. Such cylinders are pressed downwards in accordance with the said total load, causing a rise in the level of the body of liquid in which they float.

The rotary supporting mechanism shown in FIG. 1 is, as described above, provided with parallelepipedic bodies or plates 4 which slide in an up-and-down direction in the guides 5 with the object of conferring on the said mechanism the greatest possible accuracy of movement, but equally such movement can be controlled, although not with the same degree of accuracy and minimum friction, if in place of the guides 5 there are provided slides in which the ends of the shaft 3 are located. In this case the shaft 3 may be attached to the rotatable cylinder 1, rotating, of course, in unison therewith.

Apart from the mechanisms which have just been described which are intended to rotate while supporting a weight which is acting on them in a downwards direction, other have been conceived also which are capable of rotating whilst receiving thrust or resistance in an upwards direction. These latter, one of which is shown in FIG. 5, comprise two hollow cylindrical bodies, the inner 10 of which bodies is fixed while the outer body 11 is rotatable. The inner body is fixed on an axial shaft 12 the protruding ends of which are anchored in a structure which, according to the required arrangement, can rest on the said ends, or seat all of its weight on any structure independent thereof. Between the outer rotatable cylinder and the inner fixed one, there is a body of liquid 13 on which the said outer cylinder presses and rotates. The outer cylinder 11 has the capacity of displacing itself upwardly without its rotational axis becoming inclined in any respect to the fixed shaft of the fixed inner cylinder, for which purpose centring elements have been placed between the cylinders, which elements may be those shown in the drawing, or any others, which prevent the cylinders coming into contact with any contingency whatsoever. The upwards displacement of the rotatable outer cylinder is permitted by virtue of the ends of the cylinder being formed with axial orifices 14 through which the ends of the fixed shaft 12 loosely pass. Located concentrically of said holes there are provided flexible seals 15, which prevent the liquid which is contained between the two cylinders escaping to the outside. The orifices 14 are formed in collars projecting from the ends of the cylinder 10, and the collars are provided externally with bearings 16 whose contours slide and rotate on the walls of slides 17 which are arranged in a structure 18 to which the ends of the fixed shaft 12 are anchored.

This type of mechanism just described, amongst many other applications, can serve to compensate for the effects of disequilibrium which, on a rotatable platform or other element which rests and slides on supporting mechanisms according to the first embodiment, could provoke eccentrically distributed loads on them, especially as some of the said mechanisms, in a given moment, may become subjected to a greater pressure, which may cause an inclination, however slight, of the platform. With the aim of always maintaining a perfectly horizontal position, distributed equidistantly and fixed in the most suitable manner, the mechanisms specified in the second embodiment may be arranged to counter-react on being subjected to an upwards thrust and thus prevent or oppose possible inclinations that can affect the platform.

On the other hand, such mechanisms with an outer rotating cylinder can also be coupled directly to any chassis or structure which does not have any other points of support than that provided by the said cylinders which therefore act as wheels which simultaneously absorb the weight of the chassis which they sustain.

FIG. 6 shows another type of mechanism which is made up also of two hollow cylinders, of which the inner one 19 is rotatable whilst the outer one 20 is fixed against rotation and supported by a pedestal 21. Around the said fixed cylinder, there are arranged, facing one another, a pair of outermost cylinders 22, which are each open at one of their ends and are connected by their closed ends to the rotatable cylinder 19, thus rotating in unison therewith. For this to be possible, the fixed cylinder 20 is formed at its ends with axially extending cylindrical collars in which are formed slides 23 through which extend the ends of the shaft 24 of the rotatable cylinder 19, the cylinder 19 floating in a body of liquid 24 contained in the fixed cylinder 20. In the mechamism described there is provided, also, a multiplicity of conventional resilient seals 25 to prevent the escape of the body of liquid, and moreover, a multiplicity of centring elements identical or similar to those specified previously. On supporting and running a load above the outer cylinders 22, the weight of the load is absorbed by downward movement of the floating cylinder 19, which cylinder revolves on the liquid it displaces.

With the object that the recurring up-and-down movement should be the minimum necessary and, also, that the cylinder which forms the container should contain the largest quantity of liquid capable of reacting efficiently under the expected loads, it may be provided that, as shown in FIG. 7 (which is a schematic cross-section of a mechanism according to FIG. 1) the fixed cylinder 2' features a flattened cylindrical shape with the major axis thereof arranged vertically. On the other hand, and in the case where the liquid containing cylinder is also rotatable, such as occurs in FIG. 9 (which is a schematic cross-section of a mechanism according to FIG. 5) the fixed inner cylinder 10' also features a flattened cylindrical conformation, but with its major axis arranged horizontally.

Based on the same principles but assuming a distinctive shape, there have also been created some rotatable supporting mechanisms which, as can be seen from FIGS. 10, 11, 12, and 13, have a spherical configuration.

FIG. 10 shows a rotary supporting mechanism which comprises a hollow sphere 25 which is located floating in a liquid contained in an outer body 26 having a flattened spherical shape, the upper shell of the floating sphere 25 rising through an aperture made in the said outer body, which is fixed. Over the floating sphere there slides tangentially any moving load, which rotates or moves linearly. The mechanism is provided with a multiplicity of conventional elements to ensure that the external surface of the floating sphere 25 and the internal surface of the body 26 do not come into direct contact, such as perhaps freely rotating balls, amongst other things, provided on their respective surfaces.

In FIG. 11 there is shown a rotary supporting mechanism similar to that described in the previous paragraph, it being formed by a floating sphere 27 and an outer body 28 identical to those specified, but with the characteristic that the outer body, in place of the upper aperture, features a cylindrical neck or collar 29 in which a small freely rotating ball 30 is located, which ball remains in contact with the floating sphere, the surface of any moving load resting and sliding above the said ball the surface of which protrudes above the collar.

Always, if considered necessary, the floating sphere may be pivoted on a shaft arranged on a horizontal diameter of the sphere, the ends of the shaft engaging in vertically diametrically opposed slides formed in the outer sphere. Such an embodiment is not described in detail because the system of pivoting is identical or similar to that shown in FIG. 1.

It will also be appreciated that a similar type of pivoting can be applied to the ball 30 although in this case such an arrangement will only be used in mechanisms which demand great accuracy of movement, as in the normal version illustrated the said ball is already sufficiently guided by its contact with the collar in which it is located.

It is worth emphasising the fact that by merely changing the external shape of the outer body, bodies 31 (see FIG. 12) can be obtained, which, while maintaining their interior shape exactly the same as that shown in FIGS. 10 and 11, feature a flat-sided exterior so that they may be superimposed and formed into a solid assembly, the moving body sliding above the uppermost floating sphere 32. For such an embodiment to be practical, all the rotary mechanisms which are superimposed feature on the lower part an identical orifice to that which is featured on the upper part, with the object that the surfaces of adjacent floating spheres are in contact, with the exception, of course, that there is not a lower orifice in the lowermost outer body.

FIG. 13 shows a rotary supporting mechanism also of a spherical shape, but in this case it is the outer body 33 which rotates, and has the actual spherical shape, while the inner body 34 is fixed and has a flattened spherical shape, having its major diameter arranged in a horizontal position. This type of mechanism is, in detail, merely a formal variation of that shown in FIG. 5 having exchanged its cylindrical configuration for a spherical one.

The embodiments shown in FIGS. 14 and 15 are also rotary supporting mechanisms of a spherical shape. FIG. 14 shows a floating body 35 which has an extension 36 which emerges through an orifice 37 provided in the container 38, there being at the upper end of the extension, where it is anchored, the end of a structure 39 intended to describe angular movement with a short operational radius in all directions.

The version shown in FIG. 15 shows a similar embodiment, but the elements constituting it are only partly spherical, behaving otherwise in a similar manner. The rotary supporting mechanisms which have just been described, and which act like ball joints, may be employed, amongst other applications, at certain anchorage and articulation points for trailers which are towed by high tonnage trucks.

There finally remain to be described rotary supporting mechanisms whose rotatable axis is arranged vertically. Such a mechanism, contrary to those previously described, which, with the exception of those shown in FIGS. 14 and 15, generally operate in groups, can operate independently, being capable, in themselves, of supporting and causing to turn in a rotational direction the load which rests on them.

Figure 16:
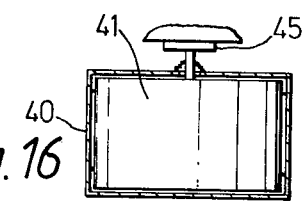

In FIGS. 16, 17, 18, and 19 there are shown various embodiments which have been created starting with that shown in FIG. 16 in which there is provided a cylindrical outer body 40 which contains inside it a floating body 41 both bodies having their axes arranged vertically, with suitable elements interposed which make for an improved rotational guiding of the inner body and assist the up-and-down movement of the body.

Figure 17:
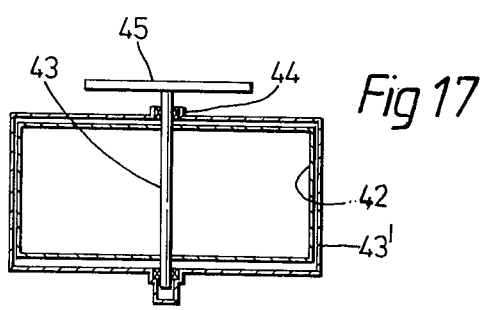

In FIG. 17, the inner body 42 of the mechanism is mounted on a shaft 43 which protrudes from the upper and lower ends of the outer body 43', both protruding shaft ends being located in centring elements, such as bushes 44 provided with conventional bearings, located in the corresponding upper and lower ends of the outer body, all this with the object of improving the rotation and the up-and-down movement of the floating inner body 42 which, thanks to the said shaft 43, suffers no lateral displacement of any kind under any weight applied in a decentralised manner on the platform 45.

In the variation shown in FIG. 18 it can be seen how the floating body 46 is located inside an outer body 47 whose height amply exceeds that of the floating body.

At the same time, the shaft 48 on which the floating body is mounted amply exceeds the height of the said body, all this with the object of increasing, with the aid of liquid input and output control valves, the extent of up-and-down movement of the said floating body, whose shaft 46 supports, for its part, a platform 45 which can be rotated if required by means of the power generated by a motor, a characteristic which is also possessed by the mechanisms previously described and those that have yet to be described A mechanism such as shown in FIG. 18 can rest on the ground or can also be suspended from a roof or appropriate support, arranging, in this latter case, some of its elements in an inverted position. Suitable liquid retention elements are provided so that the liquid cannot leak from the container.

In the case where, in the various embodiments which have been described, it is not necessary to convey a rotational movement to the platform, the floating body may, instead of being of cylindrical shape, be of a prismatic shape, a form which logically will also affect the shape of the outer body.

In FIG. 19 there is shown a rotary supporting mechanism whose outer body 49 has at its centre a vertical central portion 50 which may be hollow or solid, featuring in its design as many centring and antifriction elements as may be considered suitable, while on the other hand, the floating body 51 has the shape of an annular crown to provide a central tubular orifice 52 in which the central portion 50 of the outer body is located. The floating body 51 carries or firmly supports a platform 53 which, according to need, may or may not have upper orifice 54. In the FIG. 19 embodiment the platform has the said orifice whereas in the FIG. 20 embodiment the absence of the same can be noted.

In the said FIG. 20, it can be seen how a rotary supporting mechanism such as just described in relation to FIG. 19 may suspend a rotating platform 55 from a roof which provides the necessary reaction to support the weight of the assembly. The container 56, which features a central tubular body 57, rests on the roof 55', whilst the shaft 58 of the floating body, which extends downwardly through the said tubular orifice, has a considerable length and carries on its lower end the platform 55. The upper end of the shaft 58 is anchored on the platform 59 of the said floating body. This embodiment eliminates the liquid retention elements which are required to complete the inverted embodiment shown in FIG. 18.

There are shown in FIGS. 21 and 22 other examples of rotary supporting mechanisms with the rotational axes arranged vertically. Both figures are suitable for demonstrating an improvement which is incorporated to counteract excessive and sudden loads which, at a given moment, cannot be absorbed by the downward thrust which the floating body imparts to the liquid, this causing the liquid to spill from the outer body. With the object of avoiding such an occurence, there has been provided that in any outer body, the shape being cylindrical, annular or any other, intended for the internal location of a floating body arranged in a part of the outer body of corresponding shape and protruding above the outer body and, in the case where the outer body is provided with an upper end, in any part of the same, a circular channel 60 is arranged partly full of mercury 60', or a non-miscible liquid and which has a higher density than that contained in the outer body 61. In the same channel there is partly submerged an annular skirt 62 which is integral with the floating body 63 or with a platform, and in some cases is connected to the rotational shaft or simple guide, all this with the object of creating in the places from which the liquid could escape due to the effect of over-pressure, a syphon joint or seal capble of resisting and absorbing the pressure which the said liquid exerts when impinging on it, without the said seal, and this is a very important factor, preventing the platform, in the event of it being rotatable, continuing to turn, due to the liquid characteristics of the mercury or other liquid of suitable density.

In some of the rotary supporting mechanisms whose rotational axis is arranged horizontally, with the aim of being able to counteract the effects which an excessive load could exert through the liquid they contain, there has been evolved a type of syphon valve which is represented in FIG. 23. Such a valve comprises a chamber 64 which is connected by means of a conduit 65 with the liquid contained in the outer body of the rotary supporting mechanism, and a body 66 which moves up and down, floating suitably guided in the liquid contained in the said chamber, which body 66 features in its upper part a peripheral skirt 67 which is partly submerged in a channel 68 arranged in the upper rim of the said chamber. The said channel contains mercury 69 or any other liquid of suitable density, not being miscible with that contained in the outer body of the mechanism, nor for that matter with the liquid of the chamber, which is the same. Above the floating body 66 of the valve there impinges, at a given moment, effecting a downwards pressure, the end of the rotational shaft or any other part 70 belonging to the moving body of the rotary supporting mechanism, whilst the chamber 64 of the valve is stationary in the fixed body of the said mechanism, with which all conditions are complied with which are required for the rotatable supporting body to be capable of absorbing a greater load.

Although in the accompanying drawings, for reasons of better clarity, there has been a tendency to exaggerate the separation clearances existing between the two bodies which make up the described rotary supporting mechanisms, it should be specified that the clearance existing between their respective surfaces is very small, with the object that the liquid necessary for flotation is also very small, and, moreover, with the intention that the reactions or upward thrusts occur immediately and with a suitable rise of the liquid level.

The said liquid, according to the structure of the mechanism and according to the weight that it has to support, may be of any density and could be, for example, water, oil, or mercury. The greater the density the greater will be the weight which can be kept supported. To those liquids which easily evaporate and which present an exposed upper surface, some glycol should be incorporated to avoid this.

Always where necessary, the rotary supporting mechanisms will be provided with conventional liquid inlet and outlet control valves, by means of which the volume may be controlled either manually or automatically, including the intention of sometimes keeping the floating body immobile under certain loads which it has to support, without affecting the up-and-down movement in any way.

By means of the simple combination of all the mentioned elements, many types of rotary supporting mechanisms can be created, without regard to the complexity of the same, always provided the essential characterising characteristics are maintained, it being possible, if the case demands it, to employ hollow bodies not intended to contain liquids but full of a low density material, with the object of preventing the liquid penetrating into them through any possible open pore in the surface.

Materials, shapes, and dimensions, conditional as well as related, of the different elements used in the achievement of the object of this invention may be modified without departing from the essential scope of the invention as defined in the appended claims.

I claim:

1. A rotary supporting mechanism comprising a pair of hollow bodies arranged one inside the other, there being a quantity of liquid between the two bodies, one of the said bodies remaining fixed while the other is movable rotationally and in an up-and-down direction with respect to the body which remains fixed, the liquid between the bodies absorbing loads applied to said movable body, the rotational axis of the movable body being arranged horizontally, and the hollow bodies comprising a pair of cylindrical bodies, the inner body being movable and buoyantly floating in the liquid contained in the outer body, the movable body rotating freely on a shaft whose ends are located in vertical guides formed in the ends of the fixed body, whereby the movable body, without ceasing to rotate, carries out an up-and-down motion, counteracting in this manner the weight of a load which slides tangentially over the surface of the said movable body, there being an upper opening in the surface of the fixed body by which the load contacts the cylindrical periphery of the movable body.

* * * * *